United States Patent
Diddams et al.

(10) Patent No.: US 11,226,534 B2
(45) Date of Patent: Jan. 18, 2022

(54) METHODS AND APPARATUS FOR GENERATING MID-INFRARED FREQUENCY COMBS

(71) Applicant: The Regents of the University of Colorado, Denver, CO (US)

(72) Inventors: Scott Diddams, Louisville, CO (US); Henry Timmers, Golden, CO (US); Abijith J. Kowligy, Boulder, CO (US); Alexander Jacob Lind, Boulder, CO (US); Scott Papp, Boulder, CO (US)

(73) Assignee: Fathom Radiant, PBC, Boulder, CO (US)

(*) Notice: Subject to any disclaimer, the term of this patent is extended or adjusted under 35 U.S.C. 154(b) by 171 days.

(21) Appl. No.: 16/546,890

(22) Filed: Aug. 21, 2019

(65) Prior Publication Data

US 2020/0064708 A1 Feb. 27, 2020

Related U.S. Application Data

(60) Provisional application No. 62/720,869, filed on Aug. 21, 2018.

(51) Int. Cl.
*G02F 1/35* (2006.01)
*G02F 1/355* (2006.01)
(Continued)

(52) U.S. Cl.
CPC ........ *G02F 1/3501* (2013.01); *G02F 1/3551* (2013.01); *G02F 1/365* (2013.01);
(Continued)

(58) Field of Classification Search
CPC ...... G02F 1/3501; G02F 1/3551; G02F 1/365; G02F 2001/3503; G02F 2203/56; H01S 3/1671
See application file for complete search history.

(56) References Cited

U.S. PATENT DOCUMENTS 8,861,555 B2 * 10/2014 Fermann ............ G02B 6/02038
372/4
9,627,843 B2 * 4/2017 Zhang ................... H01S 3/1095
(Continued)

OTHER PUBLICATIONS

Timmers, Henry, et al. "Molecular fingerprinting with bright, broadband infared frequency combs." Optica 5.6 (2018): 727-732.
(Continued)

*Primary Examiner* — Daniel Petkovsek
(74) *Attorney, Agent, or Firm* — Macheledt Bales LLP; Jennifer L. Bales (57) ABSTRACT

Apparatus and methods for generating mid-IR frequency combs using intra-pulse DFG. A mode-locked pulse generation laser generates near-IR pulses which are amplified. The amplified pulses are spectrally broadened by a nonlinear element, for example a normal dispersion highly nonlinear fiber (ND-HNLF) to generate broadened pulses. The nonlinear spectral broadening element is a transparent dielectric material having a cubic nonlinear response. Broadened pulses are temporally compressed to generate short, high-power pulses which few-cycle conditioned pulses which are ready for the intrapulse DFG process. The DFG block generates a mid-IR comb by difference frequency generation. It might comprise an orientation patterned GaP (OP-GaP) crystal or a poled lithium niobate (PPLN) crystal.

16 Claims, 7 Drawing Sheets

(51) Int. Cl.
  *G02F 1/365* (2006.01)
  *H01S 3/16* (2006.01)
(52) U.S. Cl.
  CPC .......... *H01S 3/1671* (2013.01); *G02F 1/3503* (2021.01); *G02F 2203/56* (2013.01)

(56) References Cited

U.S. PATENT DOCUMENTS

| 10,042,231 | B2* | 8/2018 | Apolonskiy | .......... G02F 1/3501 |
| 2018/0003623 | A1* | 1/2018 | Apolonskiy | ........... G01N 21/35 |

OTHER PUBLICATIONS

Timmers, Henry, et al. "Molecular fingerprinting with bright, broadband infared frequency combs: supplementary material." Optica 5.6 (2018).

* cited by examiner

METHODS AND APPARATUS FOR GENERATING MID-INFRARED FREQUENCY COMBS

This invention was made with government support under grant numbers 70NANB14H095 awarded by NIST and 70NANB14H095 awarded by DOD/DARPA. The government has certain rights in the invention.

BACKGROUND OF THE INVENTION

Field of the Invention

The present invention relates to the generation of infrared laser frequency combs. In particular, the present invention relates to apparatus and methods for generating mid-infrared laser frequency combs using intra-pulse difference frequency generation (DFG).

Discussion of Related Art

Infrared molecular spectroscopy is a powerful and ubiquitous technique for measuring the chemical makeup and structure in almost any state of matter. In particular, the inter-atomic degrees of freedom within a molecule or compound lead to series of discrete, vibrational states whose resonances are unique identifiers in the mid- to long-wave infrared spectrum spanning the molecular fingerprint region from approximately 6.7 to 20 µm (~1500-500 $cm^{-1}$). For the past 50 years, Fourier transform infrared spectroscopy (FTIR) using incoherent, thermal light has been a primary tool for determining molecular structure in this spectral region, imparting wide-ranging impact in the physical, chemical, biological, and medical sciences. However, the low brightness of FTIR thermal sources restricts focusability, long-distance propagation, and spectroscopic sensitivity, while the required mechanical delay of FTIR limits the combination of spectral resolution and measurement time. Infrared laser spectroscopy has been pursued over a similar epoch, but simultaneous spectral coverage of the entire fingerprint region remains limited to radiation only available at infrared synchrotron facilities.

Optical frequency comb spectroscopy has been introduced in the past decade as a compelling alternative to FTIR by providing a unique combination of large spectral bandwidth, high frequency precision, and rapid data acquisition that can be integrated with cavity enhancement techniques or long-distance propagation to enhance sensitivity. Significant effort has gone into the development and extension of laser frequency combs deeper into the infrared spectral region beyond 2 µm, with techniques including difference frequency generation (DFG), optical parametric oscillation (OPO), mode-locked quantum cascade lasers, super-continuum generation, and Kerr micro-resonator technology. However, to date, most frequency comb sources have been restricted to wavelengths below 6 µm or have only been able to access discrete portions of the fingerprint region with limited resolution and accuracy. In parallel, there has also been ongoing research to generate broadband multi-terahertz pulses extending up to the mid-IR region through intra-pulse DFG using mode-locked oscillators based on both Ti: sapphire and Er: fiber platforms. However, reported infrared powers from such optically rectified pulses at >10 MHz repetition rates have been limited to the microwatt (µW) scale.

A need remains in the art for apparatus and methods for generating mid-IR laser frequency combs using intra-pulse DFG.

SUMMARY OF THE INVENTION

It is an object of the present invention to provide apparatus and methods for generating mid-IR laser frequency combs using intra-pulse DFG. Such systems include an oscillator configured to generate near-IR mode-locked light pulses, the pulses having a duration under 500 fsec, a normal dispersion broadening element for receiving the near-IR pulses and generating nonlinearly spectral broadened pulses, an anomalous dispersion compression element for receiving the nonlinearly spectral broadened pulses and forming few-cycle, temporally compressed, conditioned pulses and a comb generating element for receiving the conditioned pulses and generating a mid-IR frequency comb by intra-pulse difference frequency generation.

In some embodiments, the oscillator is a Er: fiber laser and the broadening element is a normal dispersion highly nonlinear fiber.

The compression element might be anomalous dispersion fused silica, such as in wedges, or dielectric chirped mirrors.

The comb generating element is generally a $\chi^{(2)}$ Crystal, such as a periodically poled lithium niobate crystal, an orientation patterned GaP crystal, a CSP crystal, or an AgS crystal.

One useful application for mid-IR frequency comb generating systems is dual comb spectroscopy. For these systems a second oscillator, broadening element, compression element, and comb generating element generates a second mid-IR frequency comb, and both combs are directed into an absorption cell containing a sample gas in such a manner as to cause dual frequency comb spectroscopy in the absorption cell. A MCT detector detects the light from the absorption cell.

Apparatus and methods are also provided for locking the frequency combs, using a reference near-IR oscillator for generating a reference near-IR signal, a filter for selecting a near-IR comb tooth from the first mid-IR frequency comb, a heterodyne element for heterodyning the reference near-IR signal and the near-IR comb tooth and generating a heterodyned signal, and a detector for detecting the mid-IR frequency comb. The detector also detects a beat note comprising the carrier envelope offset frequency of the mode-locked laser. A feedback mechanism locks the mid-IR frequency comb using the beat note and the heterodyned signal. This is especially useful in dual comb spectroscopy, where both mid-IR frequency combs are locked according to the beat note and the heterodyned signal.

The present invention enables bright, stabilized mid-IR frequency combs based on intra-pulse DFG using a few-cycle pulse derived from commonplace and robust pulse generation devices (e.g. Er: fiber laser technology). The parametric conversion occurs within a quadratic nonlinear material, for example, periodically poled lithium niobate (PPLN) crystal which employs quasi-phase matching to enhance the light conversion efficiency into the mid-IR regime. Other specific examples of quadratic nonlinear materials are orientation-patterned gallium phosphide (OP-GaP), gallium selenide (GaS), cadmium silicon phosphide (CSP), and silver gallium sulfide (AgS). The invention generates spectra containing up to several mW of average power and spanning 3-27 µm (3300-370 $cm^{-1}$), with a pathway to coverage across even broader spectral range. The present super-octave bandwidth consists of 500,000 frequency comb modes, providing a spectral resolution down to 100 MHz (0.0033 cm$^{-1}$). The present invention produces coherent, broadband infrared light exhibiting comparable brightness to an infrared beamline at synchrotron user facilities.

DETAILED DESCRIPTION OF THE INVENTION

TABLE 1

| Ref. no. | Element |
| --- | --- |
| 100, 300, 502, 504, 800 | Mid-IR comb generating systems |
| 102 | Pulse generating laser (near IR) |
| 104/204/304 | Near-IR pulses |
| 106 | Light amplifier |
| 108/208/308 | Amplified near-IR pulses |
| 110 | Nonlinear spectral broadening |
| 112/212/312 | Broadened pulses |
| 114 | Temporal compression |
| 116/216/316 | Few-cycle conditioned pulses |
| 117 | Off-axis parabolic mirror |
| 120 | Intrapulse difference frequency generation |
| 122/222/322 | Mid-IR frequency comb |
| 502 | First mid-IR comb source |
| 504 | Second mid-IR comb source |
| 506 | Absorption gas cell |
| 508 | FTS |
| 510 | MCT, reference spectrum |
| 512 | MCT detector |
| 530 | Bandpass filter |
| 602 | Optical isolator |
| 604 | Preamplifier |
| 606 | Amplifier |
| 608 | ND-HNLF |
| 610 | Chirped mirrors |
| 612 | Fused silica wedges |
| 800 | Mid-IR comb generating system |
| 801 | Lowpass filter |
| 802 | Comb |
| 804 | MCT Detector |
| 806 | DCS |
| 808 | Offset frequency beat |
| 810 | $F_0$ lock parameter |
| 812 | Heterodyned lock parameter |

TABLE 1-continued

| Ref. no. | Element |
| --- | --- |
| 814 | Comb tooth |
| 816 | Stable laser signal |
| 818 | Photodetector |
| 820 | Heterodyned signal |
| 850 | Lock dual comb spectroscopy system |

Table 1 provides reference numbers and associated elements of the invention.

Figure 1:
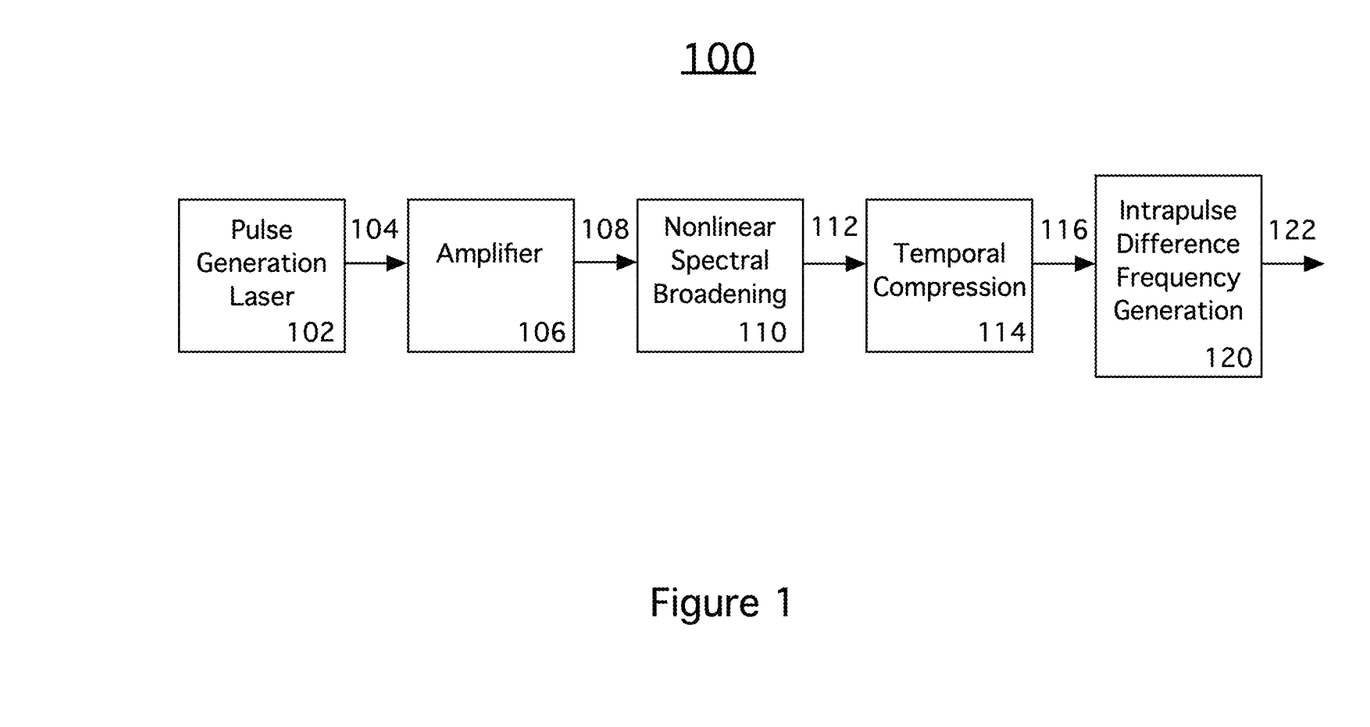
FIG. 1 is a high-level schematic block diagram of an infrared comb source according to the present invention.

FIG. 1 is a schematic block diagram of an infrared comb source 100 according to the present invention. Mode-locked pulse generation laser 102 generates near-IR pulses 104. Amplifier 106 amplifies pulses 104 to generate higher-energy pulses 108. In general amplifier 106 is utilized after laser 102 because commercially available lasers do not produce high enough energy pulses. As an alternative, amplifier 106 could incorporated into block 102.

Next, amplified pulses 108 are spectrally broadened by a nonlinear element 110, for example a normal dispersion highly nonlinear fiber (ND-HNLF) to generate broadened pulses 112. Nonlinear element 110 is a transparent, dielectric material having a cubic nonlinear response. Next, pulses 112 are temporally compressed by block 114 to generate short, high-power pulses 116. Pulses 116 are thus few-cycle conditioned pulses which are ready for the intrapulse DFG process (see FIG. 2). Intrapulse DFG block 120 receives few-cycle conditioned pulses 116 and generates a mid-IR comb 122 by difference frequency generation. Intrapulse DFG block 120 might comprise an orientation patterned GaP (OP-GaP) crystal or a poled lithium niobate (PPLN) crystal.

Figure 2:
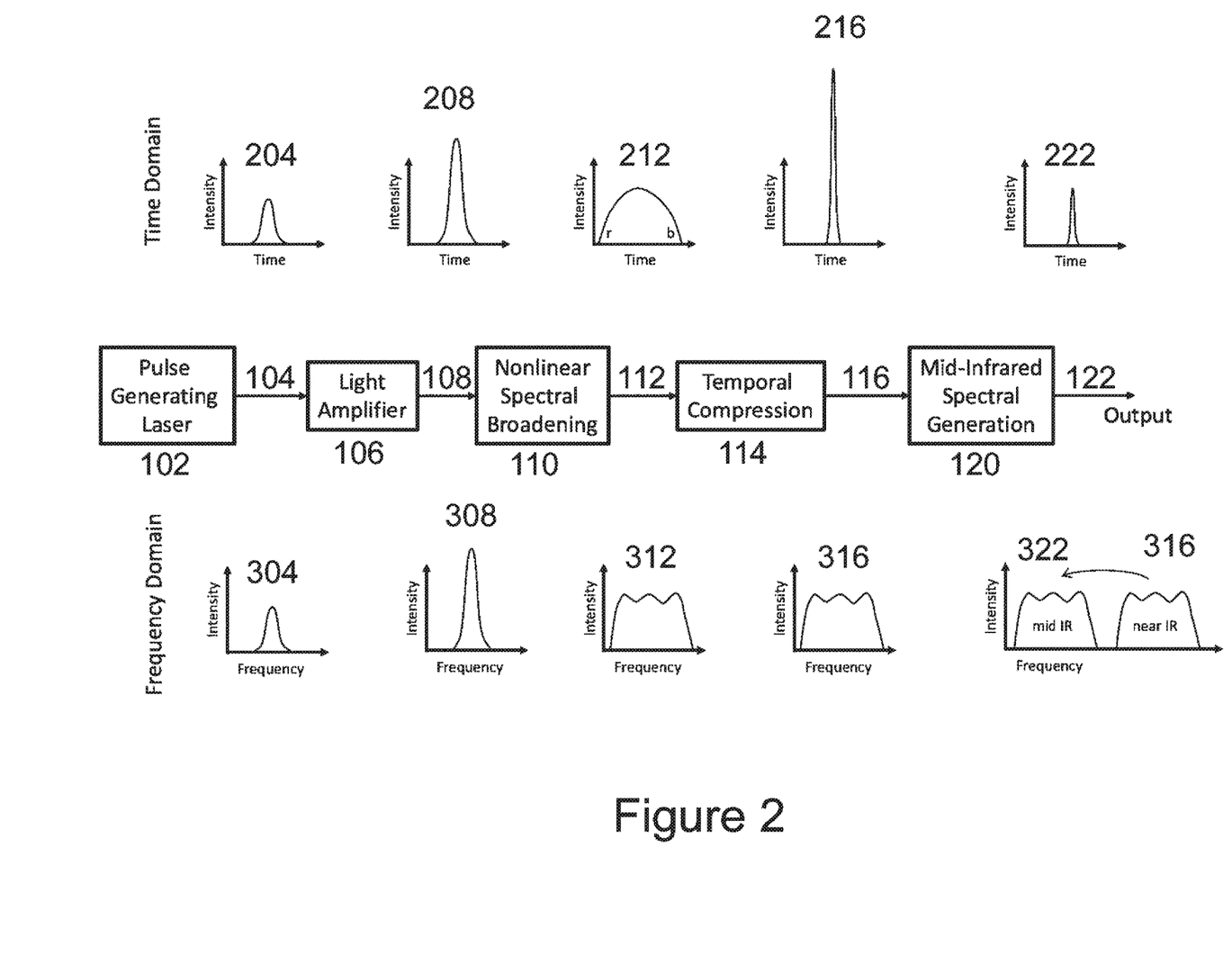
FIG. 2 is a schematic diagram illustrating the process of conditioning pulses in the comb source of FIG. 1.

FIG. 2 is a schematic diagram showing the process of generating mid-IR frequency comb 122 according to the embodiment of FIG. 1. The top row shows time domain pulses 204-222, while the bottom row shows frequency domain spectra 304-322. Thus, for example pulses 104 have a time domain plot 204 and a frequency domain plot 304. The rest of the reference numbers follow the same pattern.

In one embodiment, the pulse 104 wavelength is around 800 nm-2000 nm. Pulses 104 might be around 100-500 fs. A commercial Er: fiber mode-locked laser generating 1550 nm pulses works well. Generally, the pulses are then amplified by amplifier 106 to generate pulses 108 of around 0.3-10 Watts in energy. Pulses 108 will be about the same length and have about the same spectrum as pulses 104, just higher energy.

Nonlinear spectral broadening block 110 broadens pulses 112 with normal dispersion as shown in plot 212, wherein the higher frequency portions of the spectrum are separated from the lower-frequency portions in time. Plot 312 shows that pulses 312 are broader in frequency as well. Nonlinear spectral broadening block 110 is a transparent, dielectric material having a cubic nonlinear response, for example a normal dispersion highly nonlinear fiber (ND-HNLF).

Temporal compression block 114 compresses pulses 112 to form pulses 116, so that the pulses are short (plot 216) but still broad in frequency (plot 316). Temporal compression block 114 is anomalously dispersive and compensates for the normal dispersion and self-phase modulation imparted by nonlinear element 110. Pulses 116 are thus few-cycle conditioned pulses 116 which are ready for the intrapulse DFG process 120.

Figure 3:
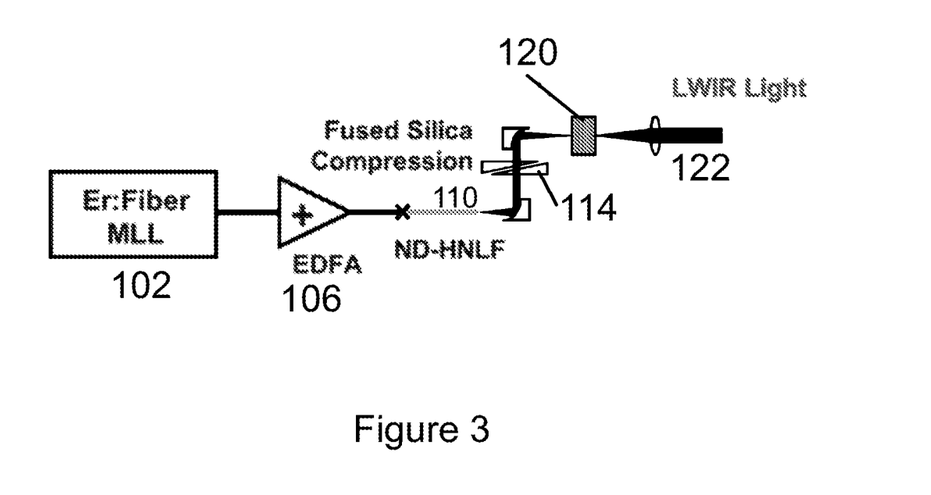
FIG. 3 is a detailed block diagram of a first embodiment of the comb source of FIG. 1.
Figure 4:
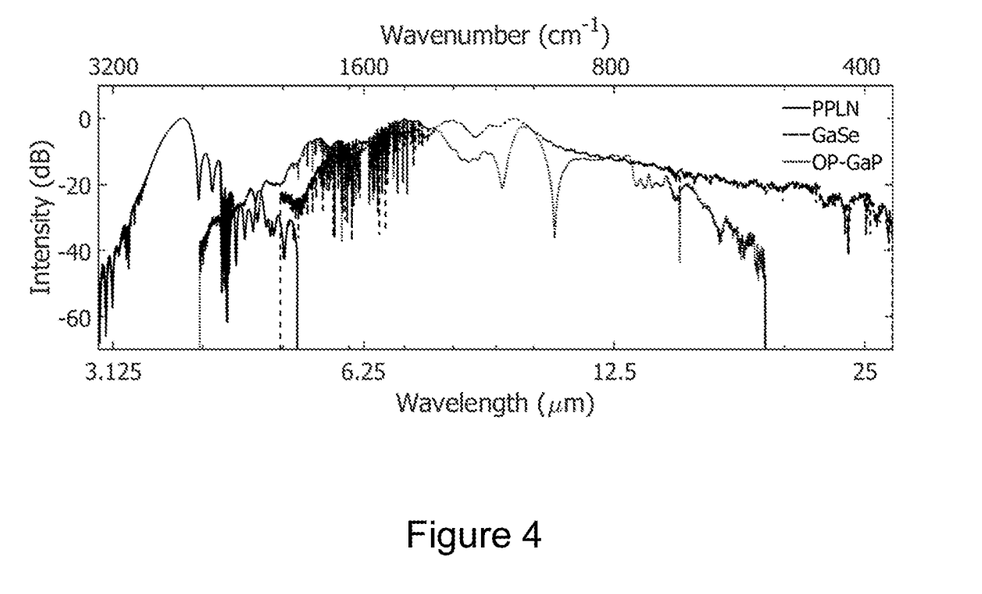
FIG. 4 is a plot showing the performance of the embodiment of FIG. 3 using various $\chi^{(2)}$ materials for intrapulse difference frequency generation.
Figure 7A:
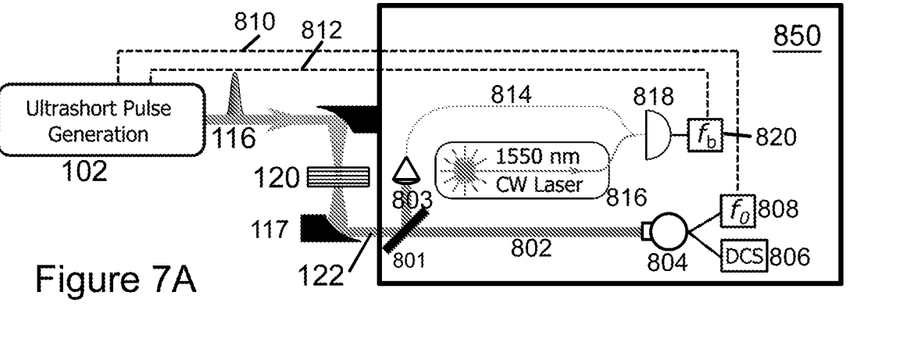
FIG. 7A is a schematic block diagram of an infrared comb source implementing a beat note as a lock parameter for comb offset frequency.

Finally, block 120 generates the mid-IR frequency comb 122 by intrapulse difference frequency generation. This process may be accomplished with an OP-GaP block, a PPLN crystal, or GaSe. FIG. 4 shows resulting mid-IR frequency combs obtained using each of these elements. FIG. 3—OP-GaP. FIG. 7A—PPLN.

FIG. 3 is a more detailed block diagram of a specific example of a mid-IR frequency comb generation system. Here, pulse generation laser 103 comprises an 100 MHz Er: fiber mode-locked laser generating femtosecond pulses. Amplifier 106 is an Er-doped fiber amplifier (EDFA) which amplifies the pulses to a pulse energy of 3.5 nJ, corresponding to an average power of 350 mW.

The compressed output of amplifier 106 is contained in optical fiber which is spliced directly to nonlinear spectral broadening block 110, in this case 4 cm of normal dispersion highly nonlinear fiber (ND-HNLF). In this embodiment, broadening block 110 generates pulses having a bandwidth of ~600 nm. The positive chirp accumulated within ND-HNLF 110 is compensated for using a pair of anomalous dispersion fused silica wedges for temporal compression 114, resulting in a few-cycle pump pulses 116. Frequency resolved optical gating may be used to measure the duration of the pulses. Pulses 116 have a temporal duration of 10.6 fs, corresponding to a two-cycle pulse.

Intrapulse difference frequency generation 120 is accomplished via OP-GaP in this embodiment. After compression 114, the few-cycle pulse 116 is focused into an OP-GaP crystal with an orientation patterning period of $\Lambda=61.1$ μm and a thickness of 1 mm. The OP-GaP crystal exhibits a high nonlinear coefficient ($d_{eff}=27$ μm/V at 1.3 μm) and broad transparency across the pump and mid-IR wavelength regime, making it ideally suited for intra-pulse down-conversion 120.

Few-cycle pulse 116 is focused into the nonlinear crystal 120, resulting in a nonlinear polarization and forward emission of mid-IR light 122 having an optical period on the order of the temporal duration of the pump pulse. In the frequency domain this corresponds to DFG between the spectral components within the few-cycle, near-infrared pump spectrum. Since the few-cycle pulses occur as a coherent pulse train, the pump spectrum consists of a comb of frequency modes given by $v_n=f_0+n\times f_{rep}$, where $f_0$ is the carrier-envelope offset frequency and $f_{rep}$ is the repetition rate of the pulse train. The pairwise difference between the nth and mth pump modes yields a mid-IR comb with frequencies $v_i=(n-m)\times f_{rep}$. A critical and advantageous aspect of the intra-pulse difference frequency is that $f_0$ is subtracted out from the pump field, providing a phase-stable, offset-free mid-IR comb consisting of exact harmonics of $f_{rep}$.

FIG. 4 shows experiment results using several $\chi^{(2)}$ materials 120 for intrapulse difference frequency generation in a system such as the system shown in FIG. 3. The generated mid-IR light 122 is collected after the $\chi^{(2)}$ crystal 120 and long-pass filtered at 3.6 μm (not shown). This setup generated mid-IR spectra 122 spanning across both infrared atmospheric transmission bands (3-5 μm and 8-12 μm) and containing up to 0.25 mW of power.

A typical spectrum optimized for bandwidth exhibits over 1.5 octaves of bandwidth from 4 to 12 μm. Results are shown for three types of $\chi^{(2)}$ crystal 120: PPLN, GaSe, and OP-GaP. Similar results are obtained with cadmium silicon phosphide (CSP), and silver gallium sulfide (AgS).

Figure 5:
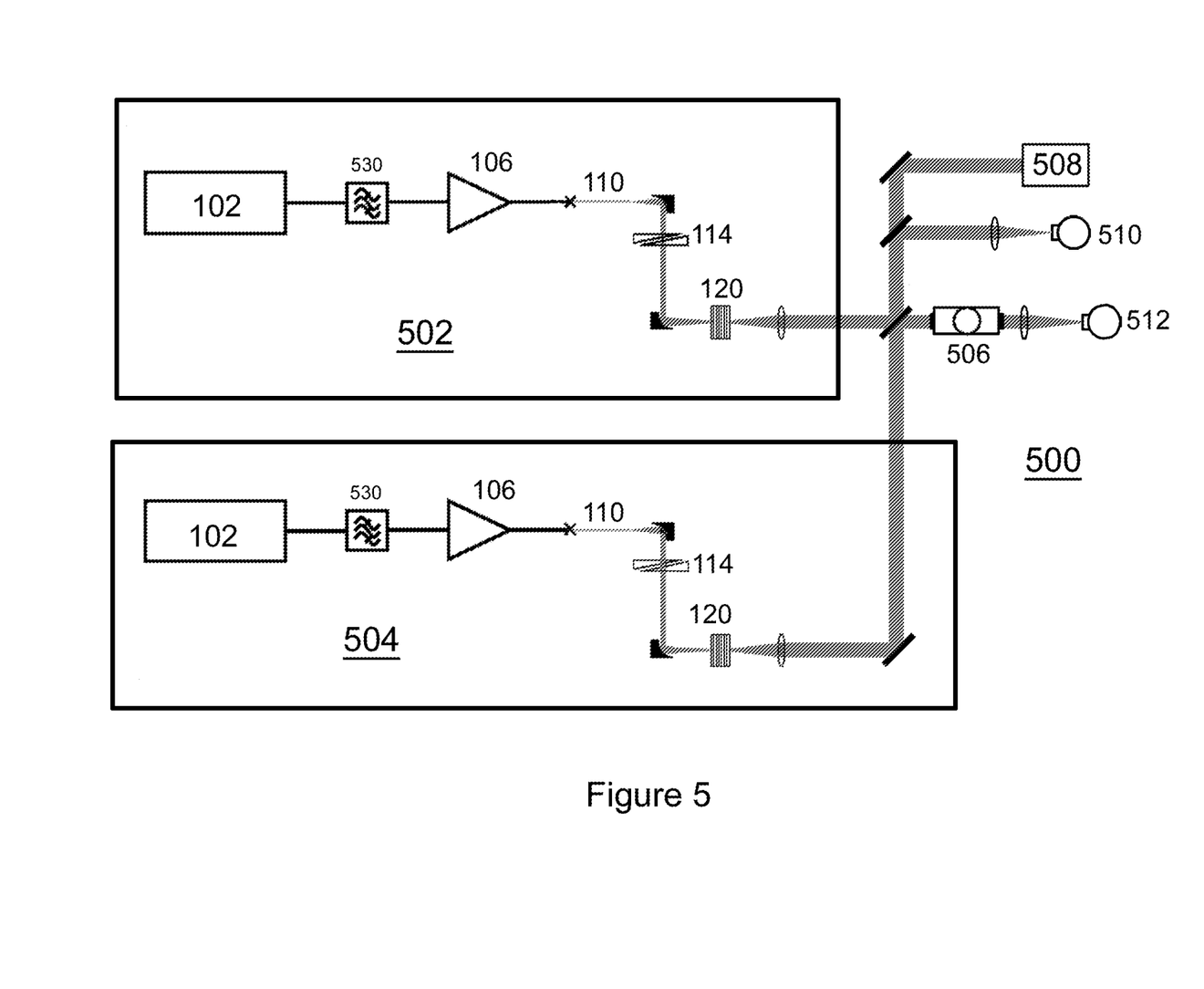
FIG. 5 is a schematic block diagram of a dual comb spectroscopy system based on two comb sources such as those shown in FIG. 3.

FIG. 5 is a schematic block diagram illustrating a dual comb spectroscopy system based on two comb sources 502, 504 similar to the one shown in FIG. 3. Comb source blocks 502 and 504 each include a bandpass filter 530 before amplifier 106, for example a 10 nm bandpass filter to filter the oscillator 102 spectrum bandwidth of $\Delta\lambda$ 40 nm centered around 1570 nm to a bandwidth of $\Delta\lambda\approx10$ nm. The filtered spectra 108 are then stretched temporally in 1 m of PANDA 1550 fiber (not shown) and amplified using a quad-pumped erbium doped fiber amplifier 106 (EDFA). A normal dispersion Er gain fiber is used to enable non-linear amplification and pulse compression. The output of amplifier 106 yields pulses 108 having powers ranging between 300-400 mW depending on the quality of the fiber components and splices. The output of amplifier 106 is spliced to nonlinear spectral broadening block 110, here a normal dispersion, highly non-linear fiber (ND-HNLF) for controlled spectral broadening. The parameters of the HNLF in this embodiment are as follows: the dispersion is D=−1.0 ps/nm km, the dispersion slope is $D_s=0.006$ ps/nm² km, and the non-linearity is $\gamma\approx10.8$ (W km)$^{-1}$. The fiber 106 length that gave the best compression (typically 30-50 fs) was spliced directly to the ND-HNLF.

The ND-HNLF 110 was connectorized with a FC/APC connector (not shown) and connected to an off-axis parabolic collimator (not shown) to output-couple the light into free space without imparting unwanted dispersion onto the broadened pulses 112.

The pulses 112 were then compressed 114 with either a bulk fused silica window (5 mm) or a pair of fused silica wedges. The anomalous dispersion from the fused silica material compensated for the normal dispersion and self-phase modulation in the ND-HNLF 110. The compressed pulses 116 were characterized using second harmonic generation FROG. Experimentally, the duration of compressed pulses 116 was 10.6 fs.

After pulse compression, the few-cycle pulses 116 were focused into an orientation patterned GaP (OP-GaP) crystal 120 with a length of 1 mm and an orientation patterning period of $\Lambda=61.1$ μm. The pulses were focused using an off-axis parabolic mirror to avoid imparting unwanted dispersion onto the few-cycle pulses 116. The generated mid-IR light 122 was collected with a ZnSe lens (not shown) and filtered using either a 3600 nm or 4500 nm long-pass filter (not shown) to remove the pump spectrum.

Block 502 generates first mid-IR frequency comb 122A and block 504 generates second mid-IR frequency comb 122B. For dual-comb spectroscopy (DCS), the two combs 122A and 122B were combined together using a mid-IR, 50-50 beamsplitter. One optical path from the beamsplitter travelled through a 15 cm absorption cell 506 containing some quantity of a sample gas. After absorption cell 506, the light was collected onto a liquid nitrogen cooled HgCdTe (MCT) detector 512. This is used as the main photo-detector for the DCS experiment. The second path from the beam-splitter travels to either a Fourier transform spectrometer (FTS) 508, where a low-resolution spectrum of the mid-IR light can be measured, or to a second MCT photo-detector 510, where a DCS reference spectrum can be acquired for the absorbance measurement. Note that the two mid-IR frequency combs 122A, 122B are mutually phase coherent, for example by locking their seed Er: fiber mode-locked lasers to a common 1550 nm continuous wave laser. Due to the nature of intra-pulse difference frequency generation according to the present invention, the mid-IR combs are offset free. However, the pump combs still exhibit an offset frequency. Therefore, the carrier-envelope offset frequencies of both combs were stabilized, for example with two inline f-2f interferometers (not shown).

The embodiment of FIG. 5 was used to perform high-resolution spectroscopy in ethanol. In addition to simultaneously measuring the four broadband absorption features in ethanol at atmospheric pressure, it also recorded a highly resolved ethanol spectrum at a lower backing pressure of 10 torr in order to discern the individual ro-vibrational lines. This is a better result than was found in the literature.

Figure 6:
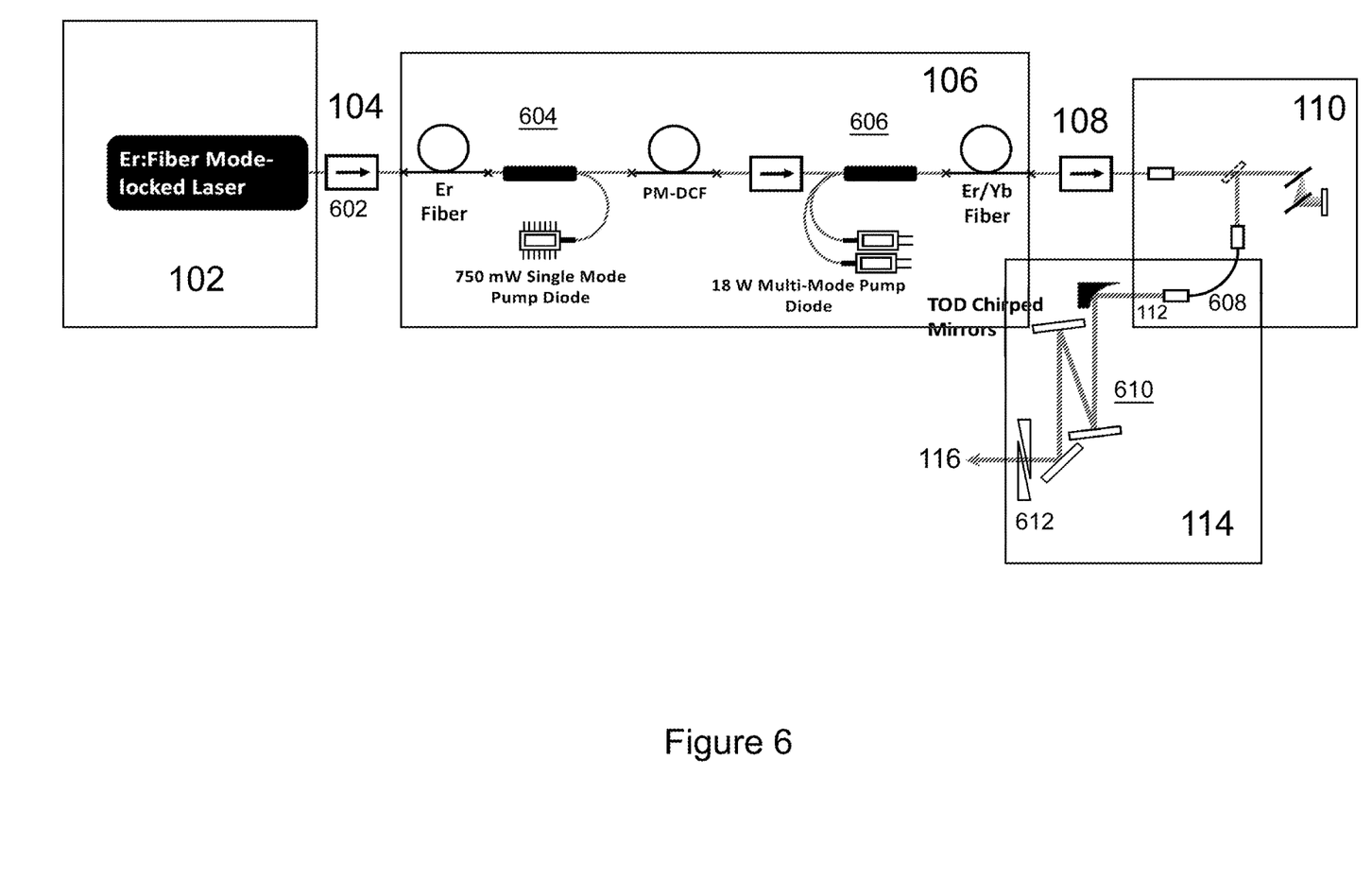
FIG. 6 is a detailed block diagram of the portion of the invention which generates higher power, few-cycle conditioned pulses.

FIG. 6 is a detailed block diagram of the portion of the invention which generates higher-power (1-10 W) few-cycle conditioned pulses 116 which are configured to be ready for the intrapulse DFG process 120 (see FIG. 2). In this embodiment, pulse generating laser 102 is an Er: Fiber Mode-locked laser generating a near-IR pulse train. An optical isolator 602 is shown to prevent light from leaking back into laser 102. Light amplifier 106 includes both a lower-power pre-amplifier 604 that employs core-pumped Er: fiber, as well as a higher-power amplifier 606 that employs cladding-pumped Er/Yb: fiber. Nonlinear spectral broadening block 110 comprises temporal compression of the amplified pulses using gratings followed by nonlinear spectral broadening in normal dispersion highly nonlinear fiber (ND-HNLF) 608. Final temporal compression to few-cycle duration occurs in block 114 which comprises chirped dielectric mirrors 610 and fused-silica wedges 612.

FIG. 7A is a schematic block diagram of a mid-IR infrared comb source 800 implementing a beat note 808 as a lock parameter for comb offset frequency. While frequency stabilization using beat note 808 is not required for MIR light generation, it is useful for applications such as dual-comb spectroscopy. A long-pass filter (LPF) 122 allows the mid-IR light 122 to pass and focus onto a MCT detector 804. Additionally, the offset frequency ($f_0$) is detected here. The light 803 reflected from LPF 122 is coupled into optical fiber 814 to heterodyne with a cavity-stabilized 1.55 μm laser output 816, which is used to fully stabilize the comb.

Figure 7B:
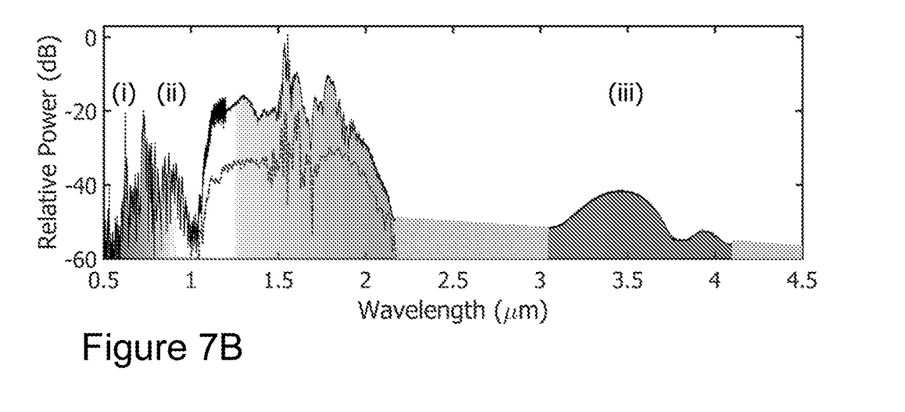
FIG. 7B is a plot showing the results of the embodiment of FIG. 7A.

FIG. 7B is a plot showing results obtained with the implementation of FIG. 7A. FIG. 7B shows the near infrared spectrum of the few-cycle pulse extending between 1 and 2 microns, as well as a mid-IR spectrum between 3 and 4 microns and visible spectrum in the region of 0.5-1 microns.

Figure 7C:
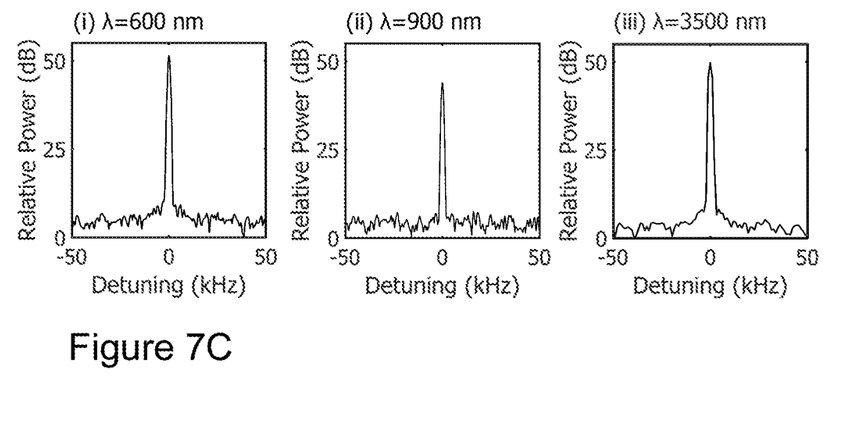
FIG. 7C is a plot showing three carrier envelope offset frequencies from the embodiment of FIG. 7A.

FIG. 7C shows three replicas of the carrier envelope offset frequency of the mode-locked laser 102 which are detected directly in the output spectra 122 at 600 nm, 900 nm and 3500 nm.

Comb source 800 generates a mid-IR frequency comb 122 by driving few-cycle pulses 116 within a $\chi^{(2)}$ material 120 (see FIG. 2). Frequency combs 122 span 3 μm to 5.5 μm. In addition to generating mid-IR frequency combs, the system also provides the carrier-envelope offset frequency of the driving pulse train 116 directly, which is used to fully stabilize the mode-locked laser 102. Elements 102-114 generate near-IR pulses 116 as shown in FIGS. 1-6. The offset frequency beat 808, measured directly from the MCT detector 804 (along with dual comb spectroscopy 806), as a consequence of cascaded non-linear processes, allows stabilization of the combs to an in-loop timing jitter <100 as.

In one embodiment, driving pulses 116 in the 1.55 μm region pump periodically poled lithium niobate (PPLN). The system amplifies 106 and spectrally broadens 110 the output 104 of a 100 MHz Er: fiber oscillator 102 to generate 3 nJ few-cycle pulses 116 (10.6 fs, 2.1 cycles) centered at 1.55 μm. The few-cycle pulses 116 are focused with a 25 mm focal length silver-coated off-axis parabolic (OAP) mirror 117 into 1 mm-long PPLN crystal 120, achieving a minimum beam diameter of 16 μm. The broadband output 120 of the PPLN crystal is collected with another OAP mirror 122, optically filtered 812, and measured on a Fourier transform spectrometer (see FIG. 5) or sent to a liquid nitrogen-cooled mercury cadmium telluride (MCT) detector 804.

The modes of a frequency comb are defined through two radio frequency parameters, the repetition rate ($f_{rep}$) and the offset frequency ($f_0$), such that a given mode, n, has a well-defined optical frequency, $v_n = nf_{rep} + f_0$. For DFG that occurs strictly within the original input pulse, the resulting mid-IR light will be "offset-free", meaning the offset frequency of the comb will subtract out in the DFG process. However, due to the high peak intensities within the crystal, cascaded $\chi^{(2)}$ nonlinear processes give rise to additional comb modes throughout the spectrum with which we observe $f_0$ in heterodyne beats at multiple wavelengths, as shown in FIG. 7C. For example, at 600 nm, we observe the 2f-3f interference, from cascaded QPM 1.8 μm tripling and 1.2 μm (third-order phase-matched) doubling at a beat frequency, fb, $$f_b = 3 \times (nf_{rep} + f_0) - 2 \times (3/2 nf_{rep} + f_0) = 3f_0 - 2f_0 = f_0 \qquad (1)$$

At 900 nm, a f-2f interference results from QPM 1.8 μm frequency doubling beating with slightly broadened comb light. At 3500 nm, we observe an "f-0" beat note between the "offset-free" DFG comb, and DFG between doubled light from 2 μm (with a factor of $2f_0$) and the original 1.5 μm comb (containing a single $f_0$). The two mid-IR combs heterodyne together on the MCT photo detector to generate an offset frequency tone in the RF spectrum.

Figure 7D:
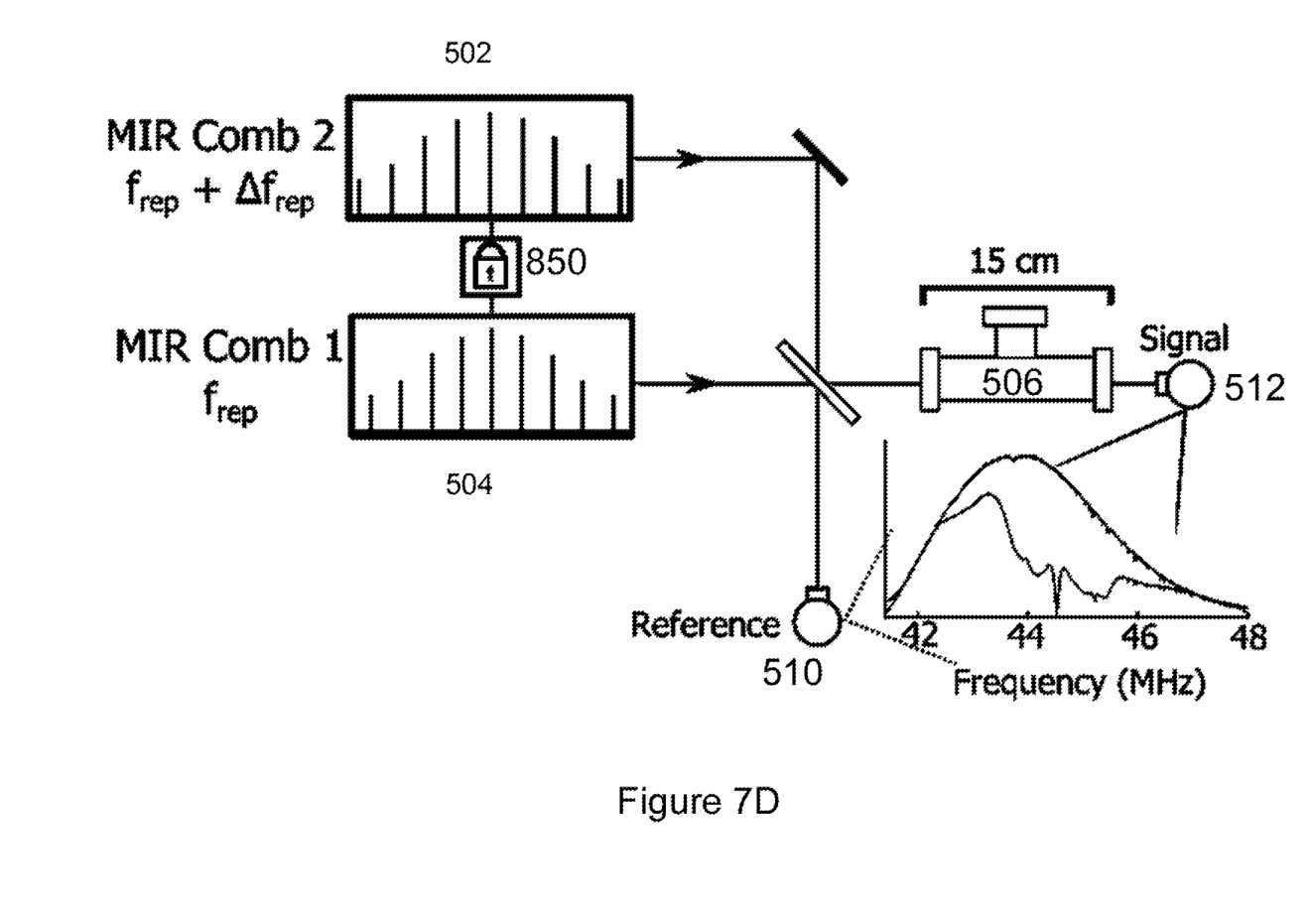
FIG. 7D is a schematic block diagram of a dual comb spectroscopy systems based upon two infrared comb sources of FIG. 7A.

System 850 implements optical frequency control at 1.55 μm, which ensures a high degree of mutual coherence necessary for applications like DCS. A near-IR comb tooth 814 heterodyned against a stable 1.55 μm laser 816 signal using photodetector 818 provides one lock parameter $f_b$ 808 as feedback 812, and an offset frequency beat 808 provides the second feedback, 810. An additional external f-2f interferometer branch is usually required to detect an offset frequency beat note; however, in this configuration, the need for such a branch is bypassed by utilizing the offset frequencies directly detected throughout the spectrum. The beat note 808 from MCT detector 804 is used for mid-IR spectroscopy to lock the offset frequency of combs 502, 504, as shown in FIG. 7D. The integrated phase noise on the offset frequency is 115 mrad, integrated from 50 Hz to 2 MHz, and comparable to other methods of offset frequency stabilization. This demonstrates that using the $f_0$ in the mid-IR results in similar performance to a traditional f-2f lock, allowing for simultaneous comb stabilization and mid-IR spectroscopy from the same detector.

The PPLN crystal 120 contains a set of discrete poling periods, ranging from $\wedge = 24.1\text{-}35.6$ μm in steps of approximately 0.6 μm. The longer (shorter) poling periods provide QPM for DFG into shorter (longer) wave-lengths in the mid-IR. By tuning across these poling periods, mid-IR light spans 3-5.5 μm (FIG. 2(a)). The maximum power measured in the mid-IR spectra is found to be 1.3 mW. However, on average these spectra yield approximately 500 μW, which is sufficient to saturate high-speed, low-noise MCT detectors in lab-scale linear spectroscopy measurements.

FIG. 7B shows the full optical spectrum after propagation through one PPLN poling period. The spectrum of the input few-cycle pulse spans 1-2 μm (dashed curve). Below 1 μm, the sharp spectral features come from higher-order quasi phase-matched (QPM) harmonic generation from the input spectrum. The mid-IR light arises from difference-frequency mixing within the input spectrum.

The bandwidth generated (300-500 nm) in the mid-IR is limited by group velocity dispersion elongating the pulse (112 fs$^2$/mm at 1.55 μm) and the phasematching bandwidth for a single poling period. Instead, by using crystals with a chirped poling period (aperiodic poling), we significantly increase the QPM bandwidth. To implement a chirped poling period, we use a fanout PPLN tilted at approximately 45 degrees, such that the pulse experiences different poling periods as it passes through the crystal. Through these chirped grating periods, bandwidths >1000 nm are generated. The chirp, and thus the generated bandwidth, is limited by the crystal angle in the current implementation. A chirp of the opposite sign results in a significantly more modulated spectrum.

While the exemplary preferred embodiments of the present invention are described herein with particularity, those skilled in the art will appreciate various changes, additions, and applications other than those specifically mentioned, which are within the spirit of this invention. For example, the potential for achieving still broader spectral coverage and higher powers should be enabling for a wide range of diagnostics of chemical and biological species, including applications in astronomical heterodyne spectroscopy and nonlinear spectroscopy.

What is claimed is:

1. An apparatus for generating a mid-IR frequency comb comprising:
   an oscillator configured to generate near-IR mode-locked light pulses, the pulses having a duration under 500 fsec;
   a normal dispersion broadening element for receiving the near-IR pulses and generating nonlinearly spectral broadened pulses;
   an anomalous dispersion compression element for receiving the nonlinearly spectral broadened pulses and forming few-cycle, temporally compressed, conditioned pulses;
   a comb generating element for receiving the conditioned pulses and generating a first mid-IR frequency comb by intrapulse difference frequency generation;
   a reference near-IR oscillator for generating a reference near-IR signal;
   a filter for selecting a near-IR comb tooth from the first mid-IR frequency comb;
   a heterodyne element for heterodyning the reference near-IR signal and the near-IR comb tooth and generating a heterodyned signal;
   a detector for detecting the first mid-IR frequency comb; wherein the detector further detects a beat note comprising a carrier envelope offset frequency of the mode-locked laser; and
   a feedback mechanism for locking the first mid-IR frequency comb using the beat note and the heterodyned signal.

2. The apparatus of claim 1 wherein the oscillator is a Er:fiber laser.

3. The apparatus of claim 1 wherein the broadening element comprises a normal dispersion highly nonlinear fiber.

4. The apparatus of claim 1 wherein the compression element comprises anomalous dispersion fused silica.

5. The apparatus of claim 1 wherein the compression element comprises anomalous dispersion fused silica wedges.

6. The apparatus of claim 1 wherein the compression element comprises anomalous dispersion dielectric chirped mirrors.

7. The apparatus of claim 1 wherein the comb generating element comprises a poled lithium niobate crystal.

8. The apparatus of claim 1 wherein the comb generating element comprises an orientation patterned GaP crystal.

9. The apparatus of claim 1 wherein the comb generating element comprises one of the following nonlinear crystals: a $CdSiP_2$ crystal; an AgS crystal; or a GaSe crystal.

10. The apparatus of claim 1 further comprising:
    a second oscillator, a second broadening element, a second compression element, and a second comb generating element for generating a second mid-IR frequency comb;
    an absorption cell containing a sample gas;
    optics for directing the first mid-IR frequency comb and the second mid-IR frequency comb into the absorption cell in such a manner as to cause dual frequency comb spectroscopy in the absorption cell; and
    a mercury cadmium telluride (MCT) detector for detecting light from the absorption cell.

11. A method of generating a mid-IR frequency comb comprising the steps of:
    (a) generating near-IR mode-locked light pulses, the pulses having a duration under 500 fsec;
    (b) receiving the near-IR pulses and generating nonlinearly spectral broadened pulses having normal dispersion;
    (c) receiving the nonlinearly spectral broadened pulses and forming few-cycle, temporally compressed, conditioned pulses while applying anomalous dispersion to account for the normal dispersion of step (b);
    (d) receiving the conditioned pulses and generating a first mid-IR frequency comb by intrapulse difference frequency generation;
    (e) generating a reference near-IR signal;
    (f) selecting a near-IR comb tooth from the first mid-IR frequency comb;
    (g) heterodyning the reference near-IR signal and the near-IR comb tooth and generating a heterodyned signal;
    (h) detecting the first mid-IR frequency comb, and detecting a beat note comprising a carrier envelope offset frequency of the mode-locked laser; and
    (i) locking the first mid-IR frequency comb using the beat note and the heterodyned signal.

12. The method of claim 11 wherein step (a) is performed by an Er:fiber laser.

13. The method of claim 11 wherein the step (b) is performed with a normal dispersion highly nonlinear fiber.

14. The method of claim 11 wherein step (c) is performed with either anomalous dispersion fused silica or dielectric chirped mirrors.

15. The method of claim 11 wherein step (d) is performed with one of the following: a poled lithium niobate crystal; an orientation patterned GaP crystal; a $CdSiP_2$ crystal; or an AgS crystal.

16. The method of claim 11, further including the steps of
    (j) generating a second mid-IR frequency comb according to steps (a)-(d);
    (k) providing a sample gas in an absorption cell;
    (l) directing the first mid-IR frequency comb and the second mid-IR frequency comb into the absorption cell in such a manner as to cause dual frequency comb spectroscopy in the absorption cell; and
    (m) detecting light from the absorption cell.

* * * * *